United States Patent [19]
Keeton et al.

[11] Patent Number: 4,469,471
[45] Date of Patent: Sep. 4, 1984

[54] ELECTROMAGNETIC FLOW COUPLER

[75] Inventors: Alvin R. Keeton, Finleyville; Philip A. Ciarelli, Jr., Clarksburg, both of Pa.

[73] Assignee: Westinghouse Electric Corp., Pittsburgh, Pa.

[21] Appl. No.: 391,030

[22] Filed: Jun. 22, 1982

[51] Int. Cl.³ ............................................ H02K 44/00
[52] U.S. Cl. ....................................... 417/50; 310/11
[58] Field of Search ............................. 417/50; 310/11

[56] References Cited
U.S. PATENT DOCUMENTS

| | | | |
|---|---|---|---|
| 2,715,190 | 8/1955 | Brill | 417/50 X |
| 3,034,002 | 5/1962 | Carlson | 310/11 |
| 3,271,597 | 9/1966 | Way | 310/11 |
| 3,280,349 | 10/1966 | Brenner et al. | 310/11 |
| 3,401,278 | 9/1968 | Ho | 310/11 |

FOREIGN PATENT DOCUMENTS 693834 7/1953 United Kingdom ................. 417/50

Primary Examiner—Edward K. Look
Attorney, Agent, or Firm—L. A. DePaul

[57] ABSTRACT

The electromagnetic flow coupler comprises substantially electrically insulated side walls for minimizing parasitic losses in the side walls. The side walls may comprise alumina plates attached to conductive members with thin stainless steel plates disposed on the inside walls of the alumina plates for reducing the flow of electricity through the side walls of the flow coupler.

8 Claims, 4 Drawing Figures

ELECTROMAGNETIC FLOW COUPLER

BACKGROUND OF THE INVENTION

This invention is related to electromagnetic pumps and more particularly to electromagnetic flow couplers.

As is well known in the art, electromagnetic pumps produce a pressure differential or a pressure head between the inlet and the outlet through the interaction of an electrical current and a crossed magnetic field. This interaction produces an electromagnetic force density throughout the volume of the fluid within the pump region wherever both the current density and the magnetic field are non-zero. At each such point, this force is proportional not only to the magnitude of the current density and magnetic field, but also to their relative orientation. The maximum force density and resulting pressure differential occurs when the electrical current and the magnetic field are mutually perpendicular to each other and to the direction of fluid flow.

Typically, the electromagnetic pumps are constructed in a rectangular duct by mounting two electrodes flush with the opposite side walls of the duct and placing the other two walls between magnetic pole faces. When the two electrodes are connected to an external power supply, current flows across the duct and interacts with the magnetic field to produce the axially directed body force and pressure difference across the duct. The pump's inlet and exit regions are defined roughly by the electrode edges. These regions may vary somewhat depending upon the relative location of the magnetic pole face edges. In an ideal pump, all the current would be confined to the duct volume enclosed by the electrodes and the pole faces where the force density is the greatest. In an actual pump, however, some current leaks into the magnetic fringe region both upstream and downstream from the electrode edges. This tends to lower pump efficiency. Thus, current leakage in the magnetic fringe regions adds little to the overall pressure differential while increasing the current flow thereby diminishing efficiency.

In general, the problems with electromagnetic pumps fall into two categories: (1) obtaining suitable high current power supplies, and (2) minimizing parasitic losses in the containment walls of the pump. Parasitic losses in the containment duct walls of electromagnetic pumps account for much of its low efficiency which may be in the range of 10 to 40%. To overcome the problems of obtaining a suitable high current power supply and to minimize parasitic losses, two electromagnetic pumps may be arranged side-by-side in a common magnetic field with one such pump acting as an electromagnetic generator and the other acting as an electromagnetic pump. This arrangement of electromagnetic pumps is commonly referred to as a "flow coupler".

In a typical flow coupler, a liquid metal is caused to flow through the generator section of the flow coupler. Passage of the fluid through the common magnetic field generates a large current which is transferred to the pump section by short, low resistance electrodes. Interaction of the current in the pump section with the common magnetic field produces flow in the pump section. In this manner, the flow of a first liquid metal in the generator section is "coupled" to the flow of a second liquid metal in the pump section. The local generation of the current enables lower voltages and higher currents to be used than would be possible with an external power supply. The lower voltages, in turn, reduce end current losses and permit higher overall efficiencies, on the order of 60%, to be attained.

While flow couplers are capable of increasing electromagnetic pump efficiencies, further reduction of parasitic containment wall losses would be desirable. Therefore, what is needed is an electromagnetic flow coupler constructed to minimize parasitic current losses in the duct walls of the flow coupler.

SUMMARY OF THE INVENTION

The electromagnetic flow coupler comprises substantially electrically insulated side walls for minimizing parasitic losses in the side walls. The side walls may comprise alumina plates attached to conductive members with thin stainless steel plates disposed on the inside walls of the alumina plates for reducing the flow of electricity through the side walls of the flow coupler.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

Figure 1:
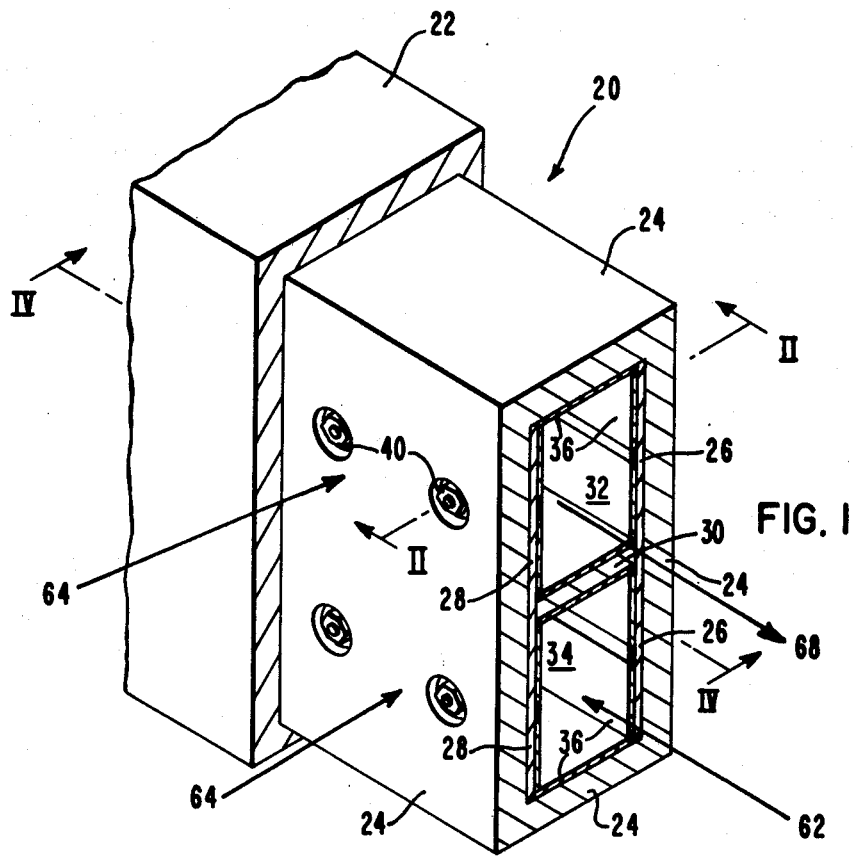
FIG. 1 is a cross-section view in perspective of the flow coupler ducts.
Figure 2:
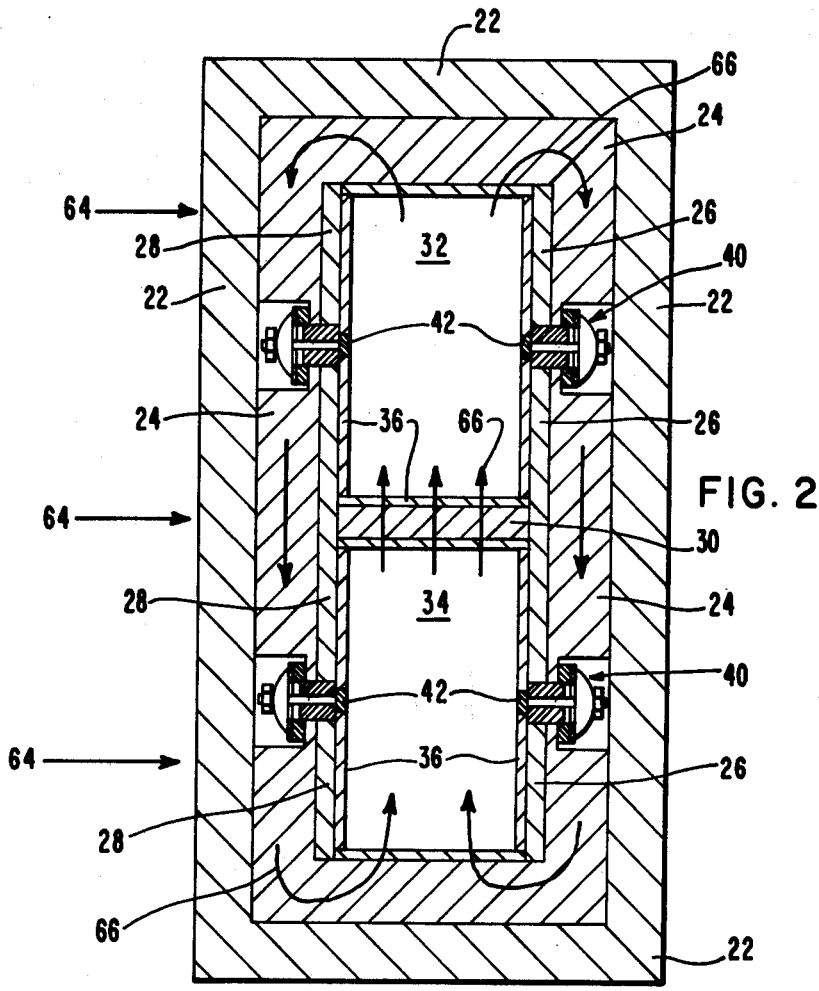
FIG. 2 is a view along line II—II of FIG. 1.

Referring to FIGS. 1 and 2, the electromagnetic flow coupler is referred to generally as 20 and comprises an outer duct 22 which may be a heavy-walled 316 stainless steel duct for providing mechanical strength and a leak-proof boundary for flow coupler 20. An electrically conductive inner duct 24 which may be made of copper is disposed within outer duct 22. A first insulator 26 is disposed on the inside of and along one wall of inner duct 24 and a second insulator 28 is disposed on the inside of and along the opposite wall of inner duct 24. First insulator 26 and second insulator 38 may be alumina plates that extend along the respective walls of inner duct 24 the length of flow coupler 20 and serve to direct the flow of electric current and minimize parasitic current losses. An electrically conductive divider plate 30, which may be copper, may be disposed in about the middle of inner duct 24 perpendicular to and attached at one end to first insulator 26 and at the other end to second insulator 28. Divider plate 30 extends approximately the length of first insulator 26 and second insulator 28 and divides flow coupler 20 into two separate but adjacent flow channels, first channel 32 and second channel 34.

First channel 32 and second channel 34 are lined with thin plates 36 of 316 stainless steel and channel the flow of liquid metal therethrough. The use of a corrosive resistant material such as stainless steel provides a means to protect first insulator 26 and second insulator 28 from the corrosive environment of the liquid metal without detracting from the insulating quality of first insulator 26 and second insulator 28. Plates 36 are bonded to inner duct 24 at surfaces not separated by insulators 26 and 28 and to divider plate 30 by a common joining method such as brazing. Plates 36 are also attached to first insulator 26 and second insulator 28 by means of attachment mechanisms 40.

Figure 3:
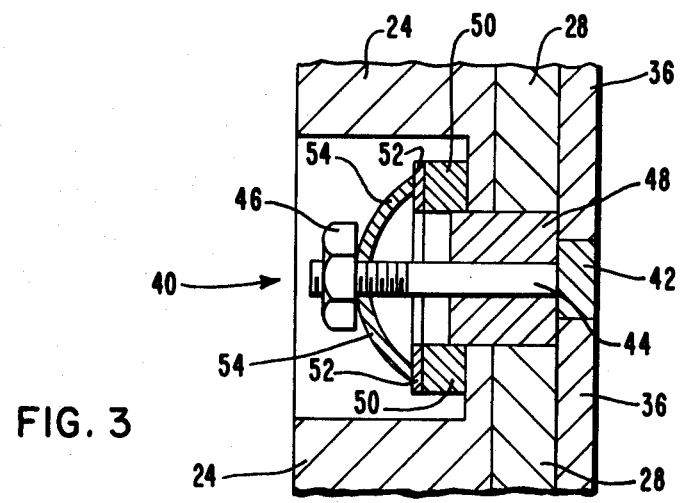
FIG. 3 is an enlarged view of the fastener.

Referring now to FIGS. 1-3, attachment mechanism 40 comprises a stainless steel rib 42 which may be welded along the length of the plates 36 which are adjacent first insulator 26 and second insulator 28. In general, only plates 36 which are disposed against first insulator 26 and second insulator 28 need be held by a rib 42 with the remaining plates 36 being capable of being bonded directly to inner duct 24 and divider plate 30. A stud 44 which is attached at one end to rib 42 and at the other end to nut 46 is disposed in an alumina bushing 48 which is located in a recessed portion of inner duct 24. An alumina washer 50 is disposed on inner duct 24 and around stud 44 and has a stainless steel washer 52 disposed on the top thereof. A stainless steel Belleville washer 54 is clamped onto washer 52 by tightening nut 46 on stud 44. The tightening of nut 46 on stud 44 causes rib 42 to be drawn tightly against bushing 48 thereby holding plates 36 against first insulator 26 or second insulator 28 without compromising the insulating qualities of first insulator 26 or second insulator 28. This is accomplished by the selective use of alumina insulating members such as bushing 48 and washer 50. Thus a conductive path is prevented from being established between plates 36 and inner duct 24. This also provides a means of accommodating differential thermal expansion between copper, alumina, and stainless steel components.

Figure 4:
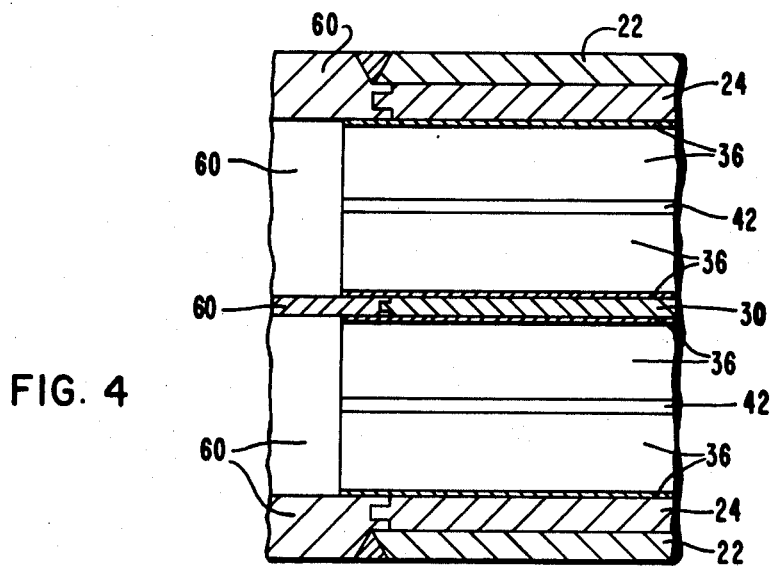
FIG. 4 is a view along line IV—IV of FIG. 1.

Referring now to FIG. 4, the flow coupler 20 may be terminated by means of a stainless steel flange 60. Plates 36 may be welded around their entire perimeter to flange 60 thus hermetically sealing first channel 32 and second channel 34. Outer duct 22 may also be welded to flange 60 to complete the sealing of the outer wall of flow coupler 20. Inner duct 24 and divider plate 30 are tongue and groove fitted to flange 60 for assembly and support. Sufficient clearance is allowed between the tongue and groove fittings to accommodate differential thermal expansion between the copper and stainless steel members. In addition, a gasket is provided in the tongue and groove fitting to electrically insulate the copper members from the stainless steel members. In addition, suitable piping may be connected to first channel 32 and to second channel 34 to independently conduct the liquid metal in separate flow paths.

Referring now to FIGS. 1 and 2, flow coupler 20 operates on the principle that a liquid metal such as sodium flowing under the influence of a pump (not shown), through a channel such as second channel 34 in the direction of arrow 62 and in the presence of a magnetic field as indicated by arrows 64, generates an electric current in a direction mutually perpendicular to the plane formed by the flow direction vector and the magnetic flux vectors. Second channel 34, therefore, becomes a DC generator with electric current flowing out its top boundary and returning through its bottom boundary as indicated by arrows 66. Since the side walls are quasi-insulated by first insulator 26 and second insulator 28, the generated current is forced to flow through first channel 32. Electric current flowing through a liquid in the presence of a magnetic field produces a force mutually perpendicular to the current and magnetic flux vectors. Thus, first channel 32 becomes a pump with the hydraulic energy from the liquid stream in second channel 34 transferred to the liquid stream in first channel 32 by the electric current which causes the liquid in first channel 32 to flow in the direction of arrow 68. In this manner flow coupler 20 provides a means for allowing the flow of a first liquid metal to pump a second liquid metal in separate flow channels.

We claim as our invention:

1. An electromagnetic flow coupler comprising:
   an outer duct;
   a substantially rectangular electrically conductive inner duct disposed within said outer duct for conducting an electric current therethrough;
   a first insulator and a second insulator disposed along opposite inside walls of said inner duct for minimizing the flow of electricity through said insulators;
   an electrically conductive divider member disposed in said inner duct and between said first insulator and said second insulator thereby dividing said inner duct into a first channel and a second channel for conducting two separate electrically conductive fluids therethrough; and
   a plurality of electrically conductive corrosion resistant plates disposed in said first and second channels for lining said channels.

2. The electromagnetic flow coupler according to claim 1 wherein said plates are stainless steel plates.

3. The electromagnetic flow coupler according to claim 2 wherein said first insulator and said second insulator are alumina.

4. The electromagnetic flow coupler according to claim 3 wherein said inner duct is copper.

5. The electromagnetic flow coupler according to claim 4 wherein said outer duct is stainless steel.

6. The electromagnetic flow coupler according to claim 5 wherein said divider member is copper.

7. The electromagnetic flow coupler according to claim 1 wherein said flow coupler further comprises an attachment mechanism disposed in said inner duct and connected to at least one of said plates for holding said plates against at least one of said insulators while preventing the flow of electricity from said plates to said inner duct through said attachment mechanism.

8. The electromagnetic flow coupler according to claim 7 wherein said attachment mechanism further comprises:
   a stainless steel rib extending along the length of and connected to one of said plates;
   a stud connected to said rib and extending through one of said insulators and through said inner duct;
   an alumina bushing disposed around said stud between said steel and said one of said insulators for preventing contact between said stud and said insulator;
   an alumina washer disposed in said inner duct and around said stud;
   a stainless steel washer disposed around said stud and on said alumina washer;
   a stainless steel Belleville washer disposed on said stud as in contact with said stainless steel washer; and
   a nut disposed on said stud for drawing said stainless steel washer against said alumina washer and for drawing said rib against said bushing when said nut is tightened on said stud thereby drawing said plates against said insulators.

* * * * *